United States Patent [19]

Kawamoto et al.

[11] Patent Number: 5,280,086

[45] Date of Patent: Jan. 18, 1994

[54] MOLDABLE COMPOSITION, PROCESS FOR PRODUCING SINTERED BODY THEREFROM AND PRODUCTS FROM SAME

[75] Inventors: Kohshi Kawamoto, Kusatsu; Tadahiro Osanaga, Kyoto, both of Japan

[73] Assignee: Sanyo Chemical Industries, Ltd., Kyoto, Japan

[21] Appl. No.: 650,883

[22] Filed: Feb. 6, 1991

[30] Foreign Application Priority Data

Feb. 6, 1990 [JP] Japan ................. 2-26846

[51] Int. Cl.$^5$ ................ C08L 59/02; C08L 57/04
[52] U.S. Cl. ................ 525/398; 525/406; 528/233; 528/467; 524/430; 524/434; 524/436; 524/437; 524/439; 524/441; 524/442; 524/755; 524/757
[58] Field of Search ............. 525/392, 406, 398; 524/430, 434, 436, 437, 439, 441, 442, 755, 757; 528/407, 233

[56] References Cited

U.S. PATENT DOCUMENTS

| | | | |
|---|---|---|---|
| 2,386,544 | 10/1945 | Crowley | 75/22 |
| 2,434,271 | 1/1948 | Howatt | 25/156 |
| 2,446,872 | 12/1941 | Ehlers | 25/156 |
| 3,125,618 | 2/1961 | Levinson | 264/63 |
| 3,285,873 | 11/1966 | Bailey | 260/30.6 |
| 4,071,594 | 1/1978 | Pearson et al. | 264/63 |
| 4,503,168 | 3/1985 | Hartsing | 523/100 |
| 4,517,319 | 5/1985 | Reske et al. | 523/200 |
| 4,551,496 | 11/1985 | Renlund et al. | 524/322 |
| 4,598,110 | 7/1986 | Koyama et al. | 523/446 |
| 4,624,812 | 11/1986 | Farrow et al. | 264/63 |
| 4,638,029 | 1/1987 | Meschke et al. | 524/430 |
| 4,680,140 | 7/1987 | Kageyama | 252/512 |
| 4,772,653 | 9/1988 | McKenna | 524/427 |
| 4,891,399 | 1/1990 | Ohkawa et al. | 523/200 |

Primary Examiner—James J. Seidleck
Assistant Examiner—W. R. H. Clark
Attorney, Agent, or Firm—Oblon, Spivak, McClelland, Maier & Neustadt

[57] ABSTRACT

Moldable compositions comprising metallic powder and/or ceramic powder, mixed an organic binder are disclosed, which comprises an ether polyamine of the formula (1) and/or a primary amine of the formula (2):

$$X^1 + (A^1 - O)_n - A^2 - X^2]_m \quad (1)$$

$$R - (O - A)_r - NH_2 \quad (2)$$

wherein $A^1$ and $A^2$ are alkylene groups or aryl-substituted alkylene groups; $X^1$ is a residue of an active hydrogen atom-containing compound having at least 2 active hydrogen atoms; n is at least 1; m is 2–8; and $X^2$ is an amino group represented by

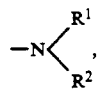

wherein $R^1$ and $R^2$ are hydrogen atom, alkyl groups or groups of the formula: $-(A^3-O)_k-R^3$, wherein $A^3$ is an alkylene group, $R^3$ is hydrogen atom or an alkyl group and k is at least 1; R is hydrogen atom or an alkyl groups containing 1–30 carbon atoms, A is an alkylene group containing 1–4 carbon atoms, and r is an integer of at least 1.

14 Claims, No Drawings

MOLDABLE COMPOSITION, PROCESS FOR PRODUCING SINTERED BODY THEREFROM AND PRODUCTS FROM SAME

BACKGROUND OF THE INVENTION

1. Field of the Invention

This invention relates to moldable metallic and/or ceramic composition, to process for producing a sintered body therefrom and to products resulting from same.

2. Description of the Prior Art

It is known to produce sintered bodies from moldable compositions comprising metallic and/or ceramic powder mixed with organic binders, such as those comprising a secondary or tertiary amines or combinations thereof with a thermoplastic resin (EP 0 329 475).

Compounds comprising such secondary or tertiary amines disclosed in EP 0 329 475 have drawbacks that the binder component is liable to bleed out from the surface of molded bodies during molding operations and the binder bleeded out may adhered to the mold to cause dificulties in continuous molding and problems arisen therefrom, and that the debinding temperature is relatively high. Thus, these known molding compositions are not always satisfied for industrial production.

SUMMARY OF THE INVENTION

It is an object of the present invention to provide a moldable metallic and/or ceramic composition, having little or reduced tendency of bleeding out of the binder component from the surface of molded bodies during molding operations and applicable to continuous molding.

It is another object of this invention to provide a moldable metallic or ceramic composition, which can be debinded at lower temperature.

It is still another object of the invention to provide a moldable metallic or ceramic composition, capable of providing economically sintered bodies free from defects, such as deformation or blistering.

It is yet another object of the invention to provide a process for producing economically sintered bodies, within a short period of time without blistering.

Briefly, these and other objects of the present invention as hereinafter will become more readily apparent have been attained broadly by a moldable composition, which comprises (I) a particulate material selected from the group consisting of metallic powders and ceramic powders, and (II) an organic binder comprising at least one amino-compound (A) selected from the group consisting of (A1) an ether polyamine represented by the formula :

where $A^1$ and $A^2$ are independently selected from the group consisting of alkylene groups containing 1–4 carbon atoms and alkylene groups containing 2–4 carbon atoms substituted with an aryl group; $X^1$ is a residue of an active hydrogen atom-containing compound having at least 2 active hydrogens; n is an integer of at least 1; m is an integer of 2–8; and $X^2$ is an amino group represented by

wherein $R^1$ and $R^2$ are independently selected from the group consisting of hydrogen atom, alkyl groups containing 1–4 carbon atoms and groups represented by the formula : $-(A^3-O)_k-R^3$, wherein $A^3$ is an alkylene group containing 1–4 carbon atoms, $R^3$ is selected from the group consisting of hydrogen atom and alkyl groups containing 1–4 carbon atoms and k is an integer of at least 1; and (A2) a primary amine represented by the formula :

wherein R is hydrogen atom or an alkyl groups containing 1–30 carbon atoms, A is an alkylene group containing 1–4 carbon atoms, and r is an integer of at least 1.

DETAILED DESCRIPTION OF THE PREFERRED EMBODIMENTS

Amino Compound (A)

(A1) Ether Polyamines of the Formula (1)

In the formula (1), examples of $A^1$ and $A^2$ include $C_1$–$C_4$ alkylene groups, such as methylene, ethylene, propylene and butylene groups; and aryl-substituted $C_2$–$C_4$ alkylene groups, such as phenyl-ethylene group. Plural $A^1$ may be the same or different. Among these, preferred are ethylene, propylene and butylene groups, and combinations of ethylene and propylene groups; more preferred are ethylene and/or propylene groups.

Illustrative of suitable active hydrogen atom-containing compounds constituting the residue $X^1$ are water; ammonia; amines, for example, aliphatic and aromatic primary amines [$C_1$–$C_{20}$alkyl amines (such as methyl amine and ethyl amine), aniline and the like], aliphatic and aromatic polyamines (such as ethylene diamine, propylene diamine, diethylene triamine, triethylene tetramine, phenylene diamine and the like), and alkanol amines (such as mono-, di- and tri- ethanol amines and propanol amines); alcohols, for instance, low molecular weight polyhydric alcohols (such as ethylene glycol, propylene glycols, 1,3- and 1,4-butane diols, 1,6-hexane diol, neopentyl glycol, cyclohexylene glycol, glycerin, trimethylol propane, pentaerythritol, sorbitol, sucrose and the like); polyhydric phenols (bisphenols, such as bisphenol A); and mixtures of two or more of them. Among these, preferred are water, ammonia and amines (particularly methyl amine, ethyl amine and ethylene diamine).

Exemplery of alkyl groups $R^1$, $R^2$ and $R^3$ are methyl, ethyl, n- and i-propyl and butyl groups. Examples of $A^3$ include the same alkylene groups as mentioned above. The oxyalkylene or polyoxyalkylene group $-(A^3-O)_k-R^3$ usually have a molecular weight of upto 500. Illustrative of $X^2$ are $-NH_2$, $-NHCH_3$, $-N(CH_3)_2$, $-NH(CH_2CH_3)$, $-N(CH_2CH_3)_2$ and $-N[(CH_2CH_2-O)_kH]_2$ (k:1–10). Among these,, preferred is $-NH_2$. Plural $X^2$ may be the same or different, preferably the same, and more preferably all the $X^2$s are $-NH_2$.

The integer n is preferably 4—about 10,000, more preferably 4—about 5,000; and m is preferably 2–4.

Suitable ether polyamines of the formula (1) include aminoethylated polyalkyleneoxides containing aminoethyl groups in both ends, which can be prepared by cyanoethylating both ends of polyalkyleneoxides, followed by hydrogenation; and alkylated or/and oxyalkylated products of these aminoethylated polyalkyleneoxides. Illustrative of polyalkyleneoxides for aminoethylation are PEO (MW 200–1,000,000, such as PEG 2000, PEG 4000, PEG 6000, PEG 20000, PEG 50000, PEO 400000, and EO adducts of ammonia), PPO (MW 200–5,000 or more, such as PPG 1000, PPG 4000, and PO adducts of ammonia), PTMG (MW 200–3,000, such as PTMG 650 and PTMG 3000). [In the above and hereinafter, PEO, PEG, EO, PO, PPO, PPG and PTMG represent polyethyleneoxide, polyethyleneglycol, ethyleneoxide, propyleneoxide, polypropyleneoxide, polypropyleneglycol and polytetramethyleneglycol, respectively; and the numbers after these abbreviations mean average molecular weight (in the round numbers).]

Among ether polyamines (A1), preferred are aminoethylated polyalkyleneoxides (particularly PEO).

(A2) Primary Amines of the Formula (2)

In the formula (2), examples of alkyl groups of R include straight-chain or branched alkyl groups containing 1–30 carbon atoms, such as methyl, ethyl, n- and i-propyl, butyl, hexyl, octyl, decyl and elcosyl groups. Preferred as R are hydrogen atom and methyl group. Examples of A include the same alkylene groups as mentioned above. Plural A may be the same or different. Among these, preferred are methylene and ethylene groups. The integer r is preferably 4—about 10,000, more preferably 4—about 5,000.

Illustrative of primary amines (A2) are monoaminoethylated polyalkyleneoxides containing aminoethyl groups in an end, which can be prepared by cyanoethylating only one end of polyalkyleneoxides (such as PEO, PPO and PTMG as mentioned above), followed by hydrogenation; and aminoethylated polyoxyalkylene alkyl ethers, which can be prepared by cyanoethylating polyoxyalkylene alkyl ethers [$C_1$–$C_4$ alkyleneoxide (such as EO) adducts of $C_1$–$C_{30}$ alkanols], followed by hydrogenation. Among these, preferred are monoaminoethylated PRO.

Molecular weight of these amino compounds (A) may be varied widely, such as upto about 1,000,000 or higher, usually about 100—about 1,000,000, preferably about 200—about 100,000, more preferably about 1,000—about 50,000.

Thermoplastic Resins (B)

Said amino compounds (A) may be used together with one or more of organic binders. As the organic binder, there can be used one or more thermoplastic resins (B), such as those obtainable by addition polymerization (polymerization of unsaturated compounds), by polycondensation and by ring-opening polymerization.

Suitable examples of thermoplastic resins of addition polymerization type include : acrylic resins [polymers and copolymers of (meth)acrylic acids (acrylic acid and methacrylic acid; similar expressions are used hereinafter) and/or esters thereof], for example, such as polymethyl (meth)acrylates, polyethyl (meth)acrylates, polybutyl (meth)acrylates, polycyclohexyl (meth)acrylates, butyl (meth)acrylate-methyl (meth)acrylate copolymers, butyl (meth)acrylate-dodecyl (meth) acrylate copolymers, butyl (meth)acrylate-acrylonitrile copolymers, methyl (meth)acrylate-acrylamide copolymers, ethyl (meth)acrylate-2-chloroethyl vinyl ether copolymers, methyl (meth)-acrylate-(meth)acrylic acid copolymers, methyl (meth)-acrylate-hydroxyethyl (meth)acrylate copolymers, and butyl (meth)acrylate-N,N-dimethylamino-ethyl (meth)acrylate copolymers; olefinic resins [(co)polymers of hydrocarbon monomers (olefins and styrenic monomers), and derivatives thereof], for example, polyethylenes, polypropylenes, polybutenes, polyisobutylenes, polystyrenes, polyalphamethylstyrenes, chlorinated polyethylenes; olefin copolymers, for example, ethylene copolymers, such as ethylenevinyl acetate copolymers, ethylene-acrylic copolymers [ethylene-methyl (meth)-acrylate copolymers, ethylenebutyl (meth)acrylate copolymers, ethylene-(meth)acrylic acid copolymers and the like], styrene copolymers, such as styrene-acrylic copolymers (styrene-methyl (meth)acrylate copolymers, styrene-butyl (meth)acrylate copolymers, styrene-(meth)acrylic acid copolymers and the like]; vinyl esteric or alcoholic resins, such as polyvinyl acetates, polyvinylacetals (polyvinylformals, polyvinylacetoacetals, polyvinylpropionals, polyvinylbutyrals, polyvinylhexylals and the like; halo-containing resins, such as polyvinyl chlorides, vinyl chloride-methyl (meth)acrylate copolymers, vinyl chloride-acrylonitrile copolymers, vinyl chloride-ethylene copolymers, polyvinylidene chlorides, poly-4-fluoroethylene, poly-3-fluoroethylene, polyvinylidene fluorides, and the like;,nitrogen-containing resins, such as poly(meth)acrylo-nitriles, polymethyl cyanoacrylates, polyvinylidene cyanides; and so on. Suitable polycondensation type resins include, for example, polyesters, such as polyethylene terephthalates, polytetramethylene terephthalates, polyethylene sebacates and the like; polycarbonates (polyalkylenecarbonates, such as polyethylenecarbonates and polypropylenecarbonates); polyamides, such as Nylon 6, Nylon 66 and Nylon 12; polyimides; arylic resins, such as polyarylethers (polyphenylene oxides), polysulfones (polyaryl-sulfones, polyethersulfones), polyphenylenesulfides, and the like. Examples of suitable ring-opening polymerization type resins are inclusive of polyacetals, such as homopolymers of trioxane, copolymers of trioxane with one or more comonomers (such as ethylene oxide, dioxolane, substituted dioxolanes, 1,4-dioxane and the like). Two or more of these thermoplastic resins can be used in combination. Semi-synthetic polymers, such as nitrocellulose, cellulose acetate and ethyl cellulose, may also be used.

It is preferred to use, as at least a part of thermoplastic resins (B), those having a heat deformation temperature (hereinafter referred to as HDT) of usually at least 130° C., preferably at least 1500° C., as measured acording to ASTM D648 using a load of 4.6 Kg/$cm^2$. Suitable examples of such resins include polyacetals, polyphenylene oxides, polysulfones, polycarbonates, polyesters and polyamides. Particularly preferred are polyacetals, which can be easily molded because of their low melt viscosity and have good heat decomposibility.

Thermoplastic resins (B) impart strength to molded articles and heighten deformation-preventing effects during debinding.

Thermoplastic resins having HDT of at least 130° C. serve for reducing deformation during debinding, as well as imparting flowability to the composition.

Polyethers

In addition to said amino compound (A), with or without said thermoplastic resin (B), there may be added at least one polyether (C) to the organic binder in order to improve moldability.

Suitable examples of said component B are polyethers, such as those represented by the formula:

$$X^3 + (A^4 - O)_p - Z]_q \qquad (3)$$

wherein $X^3$ is a residue of an active hydrogen atom-containing compound; $A^4$ is selected from the group consisting of alkylene groups containing 1-4 carbon atoms and alkylene groups containing 2-4 carbon atoms substituted with an aryl group; p is an integer of at least 2; q is an integer of 1-8; Z is selected from the group consisting of hydrogen atom, alkyl groups, aryl groups and acyl groups.

Examples of active hydrogen atom-containing compounds, constituting the residue $X^3$, are water; alcohols, for instance, low molecular weight polyols (such as ethylene glycol, propylene glycols, 1,3- and 1,4-butane diols, 1,6-hexane diol, neopentyl glycol, cyclohexylene glycol, glycerin, trimethylol propane, pentaerythritol, sorbitol, sucrose and the like), and monohydric alcohols (such as aliphatic alcohols containing 1-20 carbon atoms and aromatic alcohols); phenol5, for example, polyhydric phenols (bisphenols, such as bisphenol A), and monohydric phenols [phenol, naphthols, alkyl(- $C_1$-$C_{12}$)- or aryl-substituted phenols, such as octylphenol, nonylphenol, dodecylphenol and phenylphenols]; amines, for example, alkanol amines (such as mono-, di- and tri- ethanol amines and propanol amines), aliphatic or aromatic polyamines (such as ethylene diamine and diethylene triamine), aliphatic or aromatic monoamines [mono- and di- alkyl($C_1$-$C_{20}$) amine, aniline and the like]; and mixtures of two or more of them. Among these, preferred are water and low molecular weight polyols, particularly ethylene glycol and propylene glycols.

Suitable mono-valent hydrocarbon radicals in Z include, for example, alkyl radicals containing 1-20 carbon atoms, such as methyl, ethyl, propyl, butyl, hexyl, octyl and decyl radicals; aromatic hydrocarbon radicals, including aryl radicals (such as phenyl and naphthyl), aralkyl radicals (such as benzyl and phenethyl), and alkylaryl (octylphenyl and nonylphenyl). Examples of suitable acyl radicals in Z are those of monocarboxylic acids containing 2-20 carbon atoms, such as acetyl, propionyl, dodecanoyl and cetanoyl groups. Among Z, preferred are H and $C_1$-$C_4$ alkyl, particularly H, methyl and ethyl.

Examples of said alkylene radicals $A^4$ include the same ones as mentioned above $A^1$. Preferred are ethylene, propylene, butylene and combinations of ethylene with propylene. Particularly preferred is ethylene.

The integer p is preferably 4—about 10,000, more preferably 10—about 1,000; and q is preferably 1-3.

Molecular weight of polyethers of the formula (3) can vary widely, for instance, about 150—about 1,000,000; but usually about 200—about 500,000 preferably about 1,000—about 20,000.

Illusutrative of suitable polyethers are alkylene oxide ($C_2$-$C_4$) adducts of active hydrogen atom-containing compounds as above, or ring-opening polymerization products of such alkylene oxides, for example, polyalkylene glycols, such as PEO (MW 150-1,000,000), PPO (MW 200-5,000), PTMG (MW 200-3,000), copolymers of EO and PO (MW 200-20,000).

Among these, perferred are polyalkylene glycols, especially PEG, in view of compatibility, when used in conjunction with a polyacetal.

Polyethers (C) serves for for accelerating debinding, along with increasing flowability to facilitate injection molding and improving deformation-preventing effects during debinding. Polyethers (C) having a melting point of 30°-1000° C. are preferred; since ones having a melting point lower than 30° C. provide molded articles of poor strength, while ones having a melting point over 1000° C. result in insufficient deformation-preventing effects.

Additional Components

The binder may contain optionally one or more additional components, such as plasticizers, lubricants, surfactants, various coupling agents (such as silane coupling agents), and so on.

Suitable examples of plasticizers include ester plasticizers, including carboxylates, for example, esters of aromatic mono- or poly- carboxylic acids, such as phthalates (dimethyl, diethyl, dibutyl, diheptyl, di-noctyl, di-2-ethylhexyl, diisononyl, diisodecyl, dilauryl, dicyclohexyl and butylbenzyl phthalates, and the like), trimellitates (tris-$C_4$-$C_{11}$alkyl trimellitates, such as tris-2-ethylhexyl trimellitate, and the like), benzoates (polyoxyalkylene benzoates, such as polyoxyethylene benzoates, and the like); esters of aliphatic monobasic acids, such as butyl oleate and glycerin monooleate; esters of aliphatic dibasic acids, such as adipates (dibutyl, dihexyl, di-n-octyl, di-2-ethylhexyl, didecyl, diisodecyl and other dialkyl adipates, dibutyldiglycol adipate and the like), azelates (such as di-2-ethylbutyl and di-2-ethylhexyl azelates), sebacates (such as dibutyl, di-n-octyl and di-2-ethylhexyl sebacates), maleates (such as dibutyl and di-2-ethylhexyl maleates), fumarates (such as dibutyl fumarate), and so on; esters of hihydric alcohols, such as diethylene glycol dibenzoate and triethylene glycol di-2-ethyl-butyrate; esters of hydroxy acids, such as ricinoleates (methyl acetyl-ricinoleate, butyl acetylricinoleate and the like), glycolates (such as butyl phthaloyl butyl glycolate), citrates (triethyl acetylcitrate, tributyl acetyl-citrate and the like); and polyesters, such as polypropylene adipates; and phosphates, such as triethyl, tributyl, trioctyl, trichloroethyl, tricresyl, tributoxyethyl, trisdichloropropyl, tris-betachloropropyl, triphenyl, octyl diphenyl and tris-isopropylphenyl phosphates; epoxy plasticizers, such as epoxidized fatty esters; and other plasticizers, such as stearic acid plasticizers and chlorinated paraffin plasticizers; as well as mixtures of two or more of these plasticizers. Among these, preferred are phthalates, esters of aliphatic dibasic acids, and polyoxyalkylene benzoates. More preferred are phthalates, particularly dibutyl, dioctyl and butylbenzyl phthalates.

Illustrative examples of lubricants are aliphatic hydrocarbons and waxes, for example, liquid paraffins, natural paraffins, synthetic paraffins, petroleum wax, microcrystalline waxes, natural waxes (such as bees wax), montan wax and synthetic waxes (polyolefin waxes (such as polyethylene wax), and derivatives of them (such as partially oxidized ones, chlorinated ones and fluorinated ones)]; higher fatty alcohols ($C_{10}$-$C_{20}$ or more), such as lauric, stearyl and oleyl alcohols and mixed fatty alcohols; higher fatty acids ($C_{10}$-$C_{20}$ or more), such as lauric, stearic and oleic acids, and mixed fatty acids (those obtainable from tallow, fish oil, coconut oil, soybean oil, colza oil, rice bran oil and the like), and derivatives thereof, such as amides (oleylamide, stearamide, methylene-bis-stearamide, ethylene-bis-stearamide and the like), soaps and metallic soaps (stearates of barium, calcium, zinc, aluminum, magnesium and the like), and esters (higher fatty acid esters of monohydric alcohols (such as butyl oleate), higher fatty acid (partial) esters of polyhydric alcohols (such as glycerin monooleate), and the like]; and mixtures of two or more of them. Among these, preferred are aliphatic hydrocarbons, higher fatty acids and fatty esters, especially liquid paraffins, stearic acid and montan wax.

Suitable surfactants include those written in U.S. Pat. No. 4,331,447, for example, anionic surfactants, such as dodecylbenzene sulfonates and polyoxyethylene(4) nonylphenylether sulfates; nonionic surfactants, such as polyoxyethylene(4) stearyl amine, mono- and/or diethanol amide of stearic acids; cationic surfactants, such as lauryltrimethylammonium chloride; ampholytic surfactants, such as stearyldimethylcarboxymethyl-betain; and mixtures of two or more of them. Surfactants can improve wettability of the binder towards the particulate material.

Furthermore, there may be added one or more other materials, such as those written in EP 0 329 475, for example, secondary or tertiary amines (such as distearylamine), crosslinked thermoplastic resins and/or thermosetting resins, and so on.

Binder Composition

The amount of said amino compound (A) in the binder is usually at least 10% by weight, preferably 10–80% by weight. Use of (A) in an amount lower than 10% results in poor flowability of molding composition, and causes dificulty in molding and bleeding of the binder component during molding.

The amount of thermoplastic resin (B) in the binder is generally 0–90% by weight, preferably 10–80% by weight. More than 90% of (B) results in poor flowability of kneaded composition and dificulty in molding.

It is preferred to use thermoplastic resin (B) having HDT of at least 130° C. in such an amount of at least 20–100% by weight, preferably 30–60% by weight. Using less than 20% results in molded bodies of poor strength and difficulty in handling.

Polyether (C) may be used in such an amount of generally 0–60%, preferably 10–40%, based on the weight of the binder. Using more than 60% results in molded products of insufficient strength.

Particulate Materials

Metallic powders employed with the binder in the preparation of the moldable compositions of this invention may be prepared from any metal which is stable in the atmosphere and is reducible to powdered form. Examples of materials of metal character that are applicable for use are metals, for example, iron (such as carbonyl iron, atomized iron and reduced iron), nickel (such as carbonyl nickel), cobalt, aluminum, copper, titanium, molybdenum, zirconum, chromium, lead, manganese, wolfram, zinc, tin, beryllium, germanium, magnesium, silicon and boron; and alloys containing two or more thereof, for example, stainless steel, iron-nickel alloy, high speed steel, super alloy, magnetic materials, brass, bronze, monel metal, iron-silicon alloy, iron-boron alloy and the like; as well as mixtures of two or more of them. Among these, preferred are iron, and iron alloys, such as stainless steel, iron-nickel alloy and high speed steel.

Metallic powders may be in any of forms, such as spherical powders, odd-shaped (or irregular shaped) powders, and the like. Preferred are spherical powders.

Ceramic powders, which may be utilized in the invention in conjunction with (or in stead of) metallic powders, include for example, oxides, such as alumina, silica, zirconia, beryllia, magnesia and titania; silicates such as mullite and cordulite; titanates, such as barium titanate; carbides (particularly water non-reactive carbides), such as carbides of silicon, boron, aluminium, wolfram, titanium, zirconium, hafnium, chromium and vanadium, and carbon; nitrides, such as those of silicon, aluminum, boron and titanium; silicides, such as molybdenum disilicide; sulfides, such as cadmium sulfide and zinc sulfide; and so on, as well as mixtures of two or more of them. Among these, preferred are alumina, zirconia, mullite, silicon carbide and silicon nitride.

Ceramic powders may be in any of forms, such as spherical powders, odd-shaped (or irregular shaped) powders, whiskers, short fibers and the like. Preferred are spherical powders, odd-shaped powders and whiskers having a ratio (L/D) of major diameter (L) to minor diameter (D) of at most 1000.

These particulate materials may be used alone, or as a mixture of two or more of such materials of different kinds or different particle sizes or shapes. There can be used mixtures of metallic and ceramic powders, for example, wolfram carbide-cobalt, and alumina-aluminium. Such mixtures include blends of metallic powder and ceramic powder, and alloys of metallic powder and ceramic powder.

These particulate materials (metallic powders and/or ceramic powders) may contain usual small percentage of impurities or/and additives. For instance, sintering aids, molding agents and other additives for improving physical properties may be added by blending merely or by surface-coating onto the materials.

The average particle size of these particulate materials can vary widely, for instance, ranging from 0.01 to 100 microns, preferably 0.1 to 50 microns (micron m), in case of metallic powders and ceramic powders of spherical powders and odd-shaped powders. Particulates of less than 0.01 micron diameter are bulky and difficult to handle and result in poor moldability. Particulates of larger than 100 microns are of poor sinterability. In case of whiskers, the minor diameter is usually 0.1 to 10 microns, preferably 0.1 to 1 micron.

Moldable Composition

In moldable compositions of the present invention, the particulate material may be used in such an amount of generally 30–70%, preferably 40–60%, more preferably 50–60%, based on the volume of the composition. When the amount of the particulates is more than 70%, it become difficult to kneading homogeneously them with the binder and to injection mold. Using the particulates in smaller than 30% causes larger deformation of molded bodies during debinding.

Additional components (plasticizers, lubricants, surfactants and so on) may be used in such an amount as usually used (for instance 0–20%, preferably 0–10%, based on the weight of the composition.

Process

The composition of the invention can be produced by mixing or/and kneading the components.

Mixing can be carried out by using conventional mixing means, such as a twin-cylinder mixer, a Henschel mixer, a ball mill or the like, followed by drying if necessary. When using a twin-cylinder mixer, a Henschel mixer or the like, mixing temperature is usually 0°-100° C. preferably 0°-500° C., and mixing time is generally 10 minutes—6 hours preferably 30 minutes—2 hours. Mixing with a ball mill or the like may be carried out under dry or wet conditions, at a temperature of usually 0°-50° C., for generally 6-72 hours preferably 6-36 hours. Drying may be done within an air or an atmosphere of an inert gas, at normal pressure or under a reduced pressure, under heating and/or with hot-air. It is preferred drying under non-oxidizing atmosphere (an atmosphere of inert gas, such as nitrogen, argon or the like), or under reduced pressure.

Kneading may be carried out under melting by using any of known kneading machines, such as Banbury mixers, plast mills, kneaders, pressure kneaders, roll miles, extruders (screw extruders) and the like. Among these, preferred are pressure kneaders and extruders. Kneading temperature is generally 50°-4000° C. or higher, preferably 100°-2500° C.; and the temperature may be controled at a constant, increasing or decreasing temperature. Kneading May be carried out within an air or an atmosphere of an inert gas, preferably under non-oxidizing atmosphere (an atmosphere of inert gas, such as nitrogen, argon or the like) or under reduced pressure (in vacuo). Kneading time is usually 10 minutes—3 hours or longer (such as up to 10 hours), preferably 20 minutes—2 hours, more preferablly 30 minutes—an hour.

The components may be mixed and/or kneaded in any order as far as a homogeneous mixture is obtained. Each component or a mixture may be dried before kneading, if neccesary. Suitable kneading methods include, for example, those by charging and kneading all the components at once; those by kneading a part of the components at first, followed by adding thereto the rest and kneading [for instance, those by kneading the organic components at first and then adding thereto the particulate materials; those by kneading the particulate materials with a part of the organic components {such as said amine (A) or the binder} at first and then adding thereto the rest of the organic components {such as the binder or said amine (A)} and those by adding the organic or binder components afterwards.] The kneaded compositions may be crushed (or granulated) after cooling, follwed by pelletizing if necessary.

The moldable compositions thus obtained can be formed into various molded bodies (such as sheet, articles of complicated shape, and so on), by known molding techniques, for example, injection molding, extrusion molding, press molding (such as cold press, compression molding and transfer molding), and the like. Among these, preferred are injection molding. Injection molding may be carried out by means of usual injection molding machines, such as plunger injection machines and screw injection machines.

Molding conditions may vary according to the shape of molds and moldable compositions. In general, molding pressure is usually 10-20,000 Kg/cm$^2$, preferably 20-10,000 Kg/cm$^2$, more preferably 100-3000 Kg/cm$^2$, most preferably 200-2000 Kg/cm$^2$, and molding temperature is generally 20°-4000° C. or higher, preferably 50°-250° C., more preferably 130°-200° C. Molding may be carried out under reduced pressure (in vacuo) or under non-oxidizing atmosphere (an atmosphere of inert gas, such as nitrogen, argon or the like).

The molded articles after demolding are debinded or baked. Debinding or baking process is preferably carried out in an atmosphere of oxidizing gas (such as air), reducing gas (such as hydrogen or carbon mono-oxide) or inert gas (such as nitrogen or argon), under reduced pressure, under normal pressure or under pressure, heating at a rate of usually 0.1-500° C./hr, preferably 0.1-200° C./hr, more preferably 1-40° C./hr to a final temperature of usually 150°-500° C. or higher, preferably 180°-300° C., followed by maintaining the above temperature generally for 0-10 hours, preferably for 0-1 hours. It is preferred to debind under an atmosphere of oxidizing gas such as air.

Molded bodies comprising the composition of this invention have no or little tendency of deformation and may be debined as such, without necessity of burying in particulated material or supporting with a setter. Debinding can be accomplished merely by placing the bodies on a shelf board within a debinding furnace. By using an atmosphere-flowable shelf board, the body surface including the underside can be exposed to the atmospheric gas, whereby debinding time can be shortened. Examples of such shelf boards include wire sheets, such as stainless steel wire cloth, and support grid or ceramic formed in the shape of lattice.

The product from the debinding or baking step is then sintered to obtain the final product. Sintering can be carried out in an atmosphere of oxidizing gas, reducing gas or inert gas, under reduced pressure, under normal pressure or under pressure, heating to a final temperature of usually 600°-2500° C., preferably 600°-2200° C., more preferably 800°-2000° C. Heating rate is usually 0.1°-1000° C./hr, preferably 10°-300° C./hr. The final temperature is maintained generally for 10 minutes—10 hours, preferably for 30 minutes—3 hours. In case where the sintering operation is carried out in a vacuum, the degree of vacuum is generally $10^2$ Torr or less, preferably $10^3$ Torr or less.

In this invention, there is no necessity of brushing off of the particulate materials used in conventional methods for burying molded bodies to prevent deformation; and therefore the steps from debinding to sintering according to the invention can be carried out continuously within a same furnace.

Effects

According to the present invention, there can be obtained the following effects:

1) Moldable compositions of the present invention, containing the binder comprising said amino compound (A), have little or reduced tendency of bleeding out of the binder component from the surface of molded bodies during molding operations, and therefore can make it possible to produce molded articles continuously, without operations of periodically removing bleeded binder adhered to the mold.

2) Molded articles, produced from moldable compositions of this invention, can be easily debinded, at lower temperature and/or whithin shorter period of time.

3) Moldable compositions of the invention have improved flowability and moldability, and accordingly can be used for producing molded products of complicated configuration and/or of oversize.

4) Deformation by gravity can be inhibited, and therefore burying molded bodies in ceramic or metallic powder during debinding and use of holding fixture for shape retention become unneeded. As the results, productivity and precision of products can be improved remarkably.

5) Needlessness for burying in particurate material and removing therefrom makes it possible to carry out series production from debinding to sintering to improve productivity.

Having generally described the invention, a more complete understanding can be obtained by reference to certain specific examples, which are included for purposes of illustration only and not intended to be limiting unless otherwise specified.

In the following examples, parts, ratio and % mean parts by weight, weight ratio and % by weight, respectively, unless otherwise specified.

Abbreviated words hereinafter are as follows :

| Particulate materials: | |
|---|---|
| ALP: | aluminum powder [at most 1 micron*]. |
| STP: | stainless (SUS 304) powder [7 microns*]. |
| CBP: | carbide powder [2 microns*], comprising 95% of tungsten carbide powder and 5% of cobalt powder. |
| Amino compounds: | |
| APE-1: | aminated polyether, obtained by aminoethylating both ends of PEG 4,000. |
| APE-2: | aminated polyether, obtained by aminoethylating both ends of PEG 50,000. |
| APE-3: | aminated polyether, obtained by aminoethylating an end of PEG 20,000. |
| PAC: | polyacetal copolymer; PP: polypropylene. |
| PW: | paraffin wax. |

[*average particle size]

EXAMPLES 1-3 AND COMPARATIVE EXAMPLES 1-6

Each moldable composition, prepared according to the formulation written in Table 1, was kneaded with a pressure kneader, for about 60 minutes under conditions of charging at a temperature of 200° C. and then decreasing the temperature gradually to 180° C. (charging at a temperature of 180° C. and then decreasing the temperature gradually to 150° C., in Comparative Examples 4-6]. Then each kneaded moldable composition was injection molded using a spiral flow mold [section:- semi-circular (R:3mm)], and flowability was evaluated by measuring flow length. Each kneaded moldable composition was also injection molded into a specimen mold (100 mm×10 mm×4 mm) to observe occurance of bleeding of the organic binder component. Each molded specimen thus obtained (having such a shape as shown in FIG. 1 of EO 0 329 475) was put on two supporting rods placed at a certain distance L (10mm, 20mm or 40mm), as shown in FIG. 2 of EO 0 329 475, followed by heating it within a circulating furnace from the room temperature to a temperature of 250° C. (350° C. in Comparative Examples 4-6] at a rate of 10° C./hr to carry out debinding. The debinding ratio (degree of binder-removement) of the resulting debinded body was about 97%. Appearance (presence of crack and blister) of each debinded body thus obtained was observed, and degree of deformation of the debinded body was evaluated by the deformed height (h) as shown in FIG. 3 of EO 0 329 475. The results were as shown in Table 2.

TABLE 1

| No. | Example | | | Comparative Example | | | | | |
|---|---|---|---|---|---|---|---|---|---|
| | 1 | 2 | 3 | 1 | 2 | 3 | 4 | 5 | 6 |
| ALP | 100.0 | — | — | 100.0 | — | — | — | 100.0 | — |
| STP | — | 100.0 | — | — | 100.0 | — | — | 100.0 | — |
| CBP | — | — | 100.0 | — | — | 100.0 | — | — | 100.0 |
| APE-1 | 12.8 | 7.6 | 5.1 | — | — | — | — | — | — |
| PEG* | — | — | — | 12.8 | 7.6 | 5.1 | — | — | — |
| PAC | 8.5 | 5.1 | 3.4 | 8.5 | 5.1 | 3.4 | — | — | — |
| PP | — | — | — | 7.5 | 4.5 | 3.0 | — | — | — |
| PW | — | — | — | 7.5 | 4.5 | 3.0 | — | — | — |

*PEG 4000

TABLE 2

| | | Injection molding | | Debinding | | | |
|---|---|---|---|---|---|---|---|
| | | Spiral flow length, cm | Bleed | Crack, Blister | Deformed height (h), mm | | |
| Example No. | | | | | L = 10 | L = 20 | L = 40 |
| Example | 1 | 14 | NO | NO | 0 | 0 | 0 |
| | 2 | 18 | NO | NO | 0 | 0 | 0 |
| | 3 | 17 | NO | NO | 0 | 0 | 1 |
| Comparative Example | 1 | 15 | Ob | NO | 0 | 0 | 0 |
| | 2 | 20 | Ob | NO | 0 | 0 | 0 |
| | 3 | 18 | Ob | NO | 0 | 0 | 1 |
| | 4 | 8 | NO | NO | 5 | 5 | 5 |
| | 5 | 13 | NO | NO | 5 | 5 | 5 |
| | 6 | 10 | NO | NO | 5 | 5 | 5 |

(Notes)
*NO: Not observed; Ob: Observed.

EXAMPLES 4-7

In the same manner as in Example 1, each moldable composition prepared according to the formulation written in Table 3 was kneaded and injection molded into a specimen mold (100 mm×10 mm×4 mm). All the molded bodies thus obtained were of good appearance.

Each molded specimen was debinded by heating from room temperature to a temperature of 250° C. at a rate of 10° C./hr [3° C./hr *Ln Example 5], within a circulating furnace set on 100 mesh stainless steel wire cloth so as to exposing the surface including the underside to circulating hot air to shorten the debinding time. There were obtained debinded bodies of good appearance (free from any crack, blister and deformation) with debinding ratio (DR) as written in Table 3. Each debinded body thus obtained was sintered in a vacuum of $10^{-4}$ Torr or less, for 2 hrs at a temperature written in Table 3. There were obtained sintered bodies having relative density (RD) as written in Table 3.

TABLE 3

| | Example No. | | | |
|---|---|---|---|---|
| | 4 | 5 | 6 | 7 |
| ALP | 100.0 | — | — | — |
| STP | — | — | 100.0 | 100.0 |
| CBP | — | 100.0 | — | — |
| APE-1 | 6.3 | 4.2 | — | — |
| APE-2 | — | — | 4.0 | — |
| APE-3 | — | — | — | 4.0 |
| PEG 4000 | 1.3 | 0.9 | — | — |
| PEG 1000 | — | — | 3.0 | 3.0 |
| PAC | 5.1 | 3.4 | 3.0 | 3.0 |
| Sintering Temperature, °C. | 1250 | 1420 | 1250 | 1250 |
| Debinding ratio, % | 97 | 93 | 98 | 98 |
| Relative density, % | 95 | 99 | 97 | 95 |

What is claimed and desired to be secured by Letters Patent is:

1. A moldable composition, which comprises (I) a particulate material selected from the group consisting of metallic powders and ceramic powders, and (II) an organic binder comprising at least one amino compound (A) selected from the group consisting of (A1) an ether polyamine represented by the formula:

$$X^1 + (A^1-O)_n - A^2 - X^2]_m \quad (1)$$

wherein $A^1$ and $A^2$ are independently selected from the group consisting of alkylene groups containing 1–4 carbon atoms and alkylene groups containing 2–4 carbon atoms substituted with an aryl group; $X^1$ is a residue of an active hydrogen atom-containing compound having at least 2 active hydrogen atoms; n is an integer of at least 1; m is an integer of 2–8; and $X^2$ is an amino group represented by

wherein $R^1$ and $R^2$ are independently selected from the group consisting of hydrogen atom, alkyl groups containing 1–4 carbon atoms and groups having a molecular weight of up to 500 and represented by the formula: $-(A^3-O)_k-R^3$, wherein $A^3$ is an alkylene group containing 1–4 carbon atoms, $R^3$ is selected from the group consisting of hydrogen atom and alkyl groups containing 1–4 carbon atoms and k is an integer of at least 1; and (A2) a primary amine represented by the formula:

$$R-(O-A)_r-NH_2 \quad (2)$$

wherein R is hydrogen atom or an alkyl group containing 1–30 carbon atoms, A is an alkylene group containing 1–4 carbon atoms, and r is an integer of at least 1, said amino compound (A) having a molecular weight of at least about 1,000 and up to about 1,000,000.

2. The composition of claim 1, wherein said amino compound (A) comprises at least one ether polyamine (A1) represented by the formula (1).

3. The composition of claim 2, wherein $R^1$ and $R^2$ are independently selected from the group consisting of hydrogen atom and alkyl groups containing 1–4 carbon atoms.

4. The composition of claim 2, wherein $X^1$ is a residue of an active hydrogen atom-containing compound, selected from the group consisting of water, ammonia, aliphatic and aromatic primary monoamines, aliphatic and aromatic polyamines, alkanol amines, polyhydric alcohols and polyhydric phenols.

5. The composition of claim 1, which contains at least 10% of said amino compound (A), based on the weight of the binder.

6. The composition of claim 2, which contains at least 10% of said amino compound (A1), based on the weight of the binder.

7. A molded article, obtained by a process comprising injection molding the composition of claim 2.

8. A molded article, obtained by a process comprising the steps of shaping a body from a moldable composition of claim 2, heating the shaped body to remove the binder, and sintering the debinded body.

9. A moldable composition, which comprises (I) a particulate material selected from the group consisting of metallic powders and ceramic powders, and (II) an organic binder comprising an ether polyamine represented by the formula:

$$X^1 + (A^1-O)_n - A^2 - X^2]_m \quad (1)$$

wherein $A^1$ and $A^2$ are independently selected from the group consisting of alkylene groups containing 1–4 carbon atoms and alkylene groups containing 2–4 carbon atoms substituted with an aryl group; $X^1$ is a residue of an active hydrogen atom-containing compound having at least 2 active hydrogen atoms; n is an integer of at least 1; m is an integer of 2–8; and $X^2$ is an amino group represented by

wherein $R^1$ and $R^2$ are independently selected from the group consisting of hydrogen atom, alkyl groups containing 1–4 carbon atoms and groups having a molecular weight of up to 500 and represented by the formula: $-(A^3-O)_k-R^3$, wherein $A^3$ is an alkylene group containing 1–4 carbon atoms, $R^3$ is selected from the group consisting of hydrogen atom and alkyl groups containing 1–4 carbon atoms and k is an integer of at least 1 said ether polyamine having a molecular weight up to about 1,000,000.

10. The composition of claim 9, which contains at least 10% of said ether polyamine based on the weight of the binder.

11. The composition of claim 9, wherein $R^1$ and $R^2$ are independently selected from the group consisting of hydrogen atoms and alkyl groups containing 1–4 carbon atoms.

12. The composition of claim 9, wherein $X^1$ is a residue of an active hydrogen atom-containing compound selected from the group consisting of water, ammonia, aliphatic and aromatic primary monoamines, aliphatic and aromatic polyamines, alkanol amines, polyhydric alcohols and polyhydric phenols.

13. A molded article, obtained by a process comprising injection molding the composition of claim 9.

14. A molded article, obtained by a process comprising the steps of shaping a body from a moldable composition of claim 9, heating the shaped body to remove the binder, and sintering the debinded body.

* * * * *